May 5, 1964    R. H. WISE    3,131,414
WINDSHIELD WIPER BLADE
Filed July 24, 1961    2 Sheets-Sheet 1
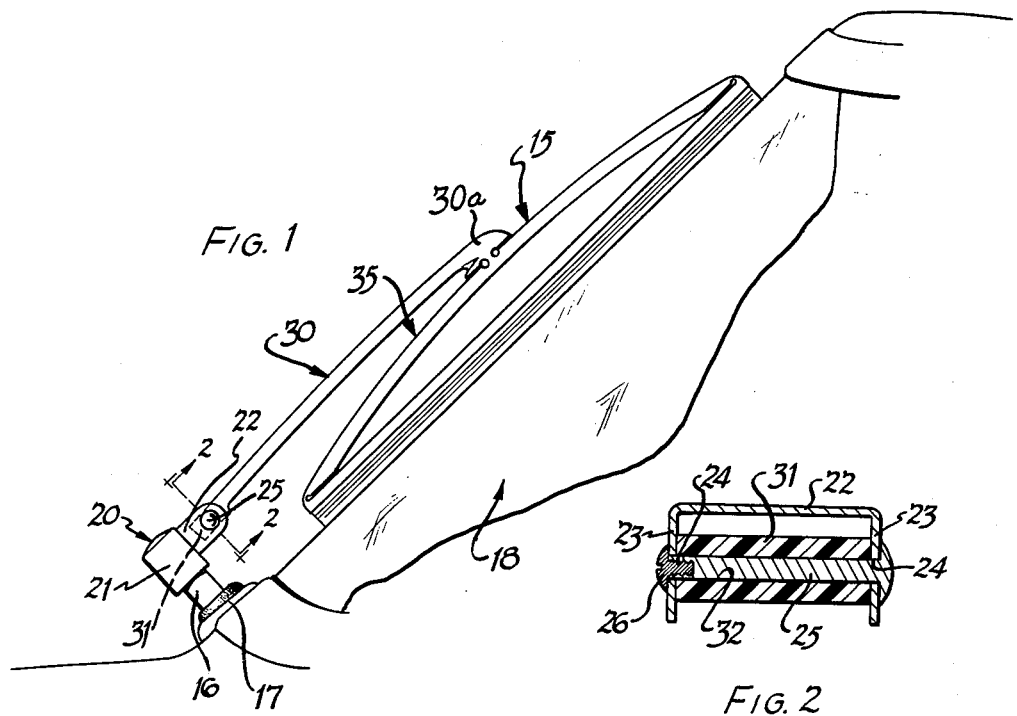
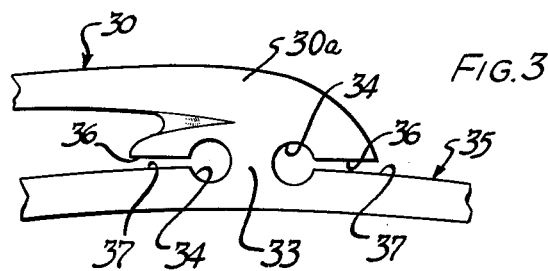
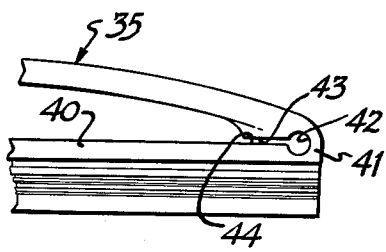
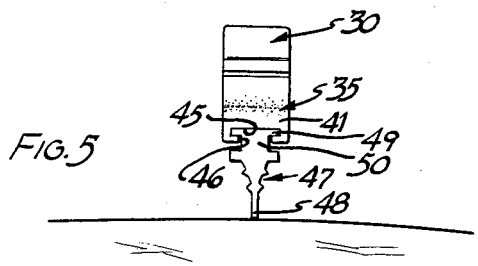
INVENTOR.
RALPH H. WISE
BY
WILSON, SETTLE & CRAIG
ATTORNEYS May 5, 1964 R. H. WISE 3,131,414
WINDSHIELD WIPER BLADE
Filed July 24, 1961 2 Sheets-Sheet 2
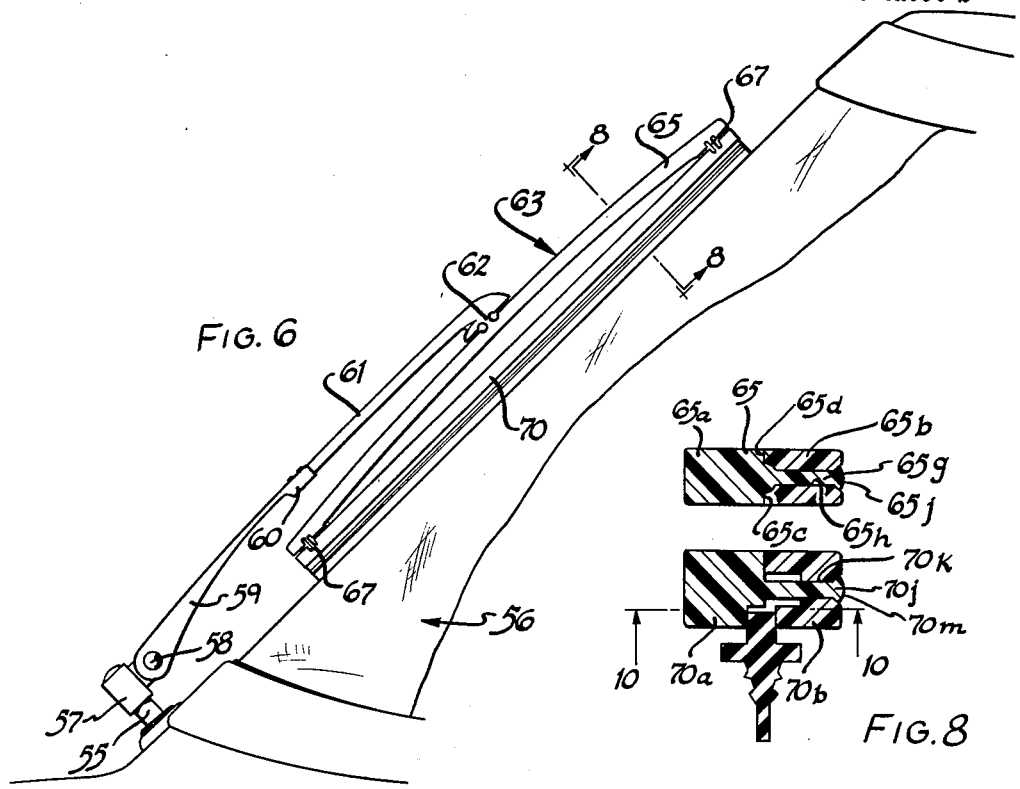
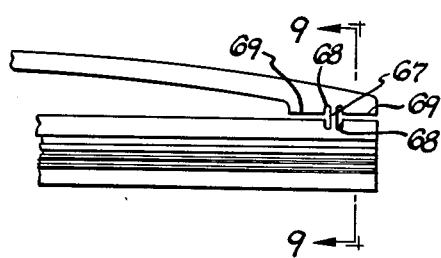
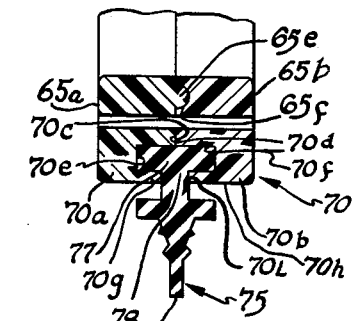
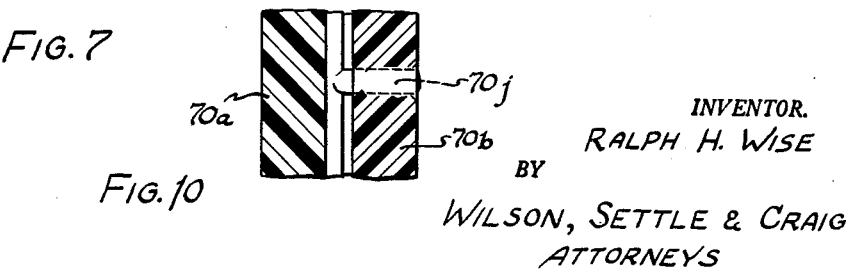
INVENTOR.
RALPH H. WISE
BY
WILSON, SETTLE & CRAIG
ATTORNEYS United States Patent Office 3,131,414
Patented May 5, 1964

3,131,414
WINDSHIELD WIPER BLADE
Ralph H. Wise, 211 N. Church St., Dyersburg, Tenn.
Filed July 24, 1961, Ser. No. 126,122
13 Claims. (Cl. 15—250.42)

The present invention relates to a windshield wiper assembly and more particularly to a windshield wiper formed of plastic material to provide an integral, multi-part assembly capable of efficient wiping action.

Prior windshield wiping apparatus conventionally includes an oscillatable pivot shaft driven by suitable means, as by a vacuum motor or an electric motor, an arm assembly connected to the pivot shaft for oscillation therewith, and a windshield wiper blade formed separately from the arm and detachably secured to the arm to traverse the windshield upon pivot shaft oscillation. The conventional wiper blade comprises an assembly of stamped sheet metal bridges or yokes secured to a wiping element carrier, the carrier typically including a formed sheet metal strip within which the rubber wiping element is secured for actual contact with the windshield.

These complicated and expensive conventional wiper assemblies possess several inherent disadvantages in addition to their high cost. More particularly, many different forms of arm-to-blade connections have been provided in the past as original automotive equipment and separate, expensive "throw-away" connector parts must be provided for each replacement blade to insure interchangeability. Further, the loss of the rubber wiping element or rupture of the wiping element necessarily results in a scratched, and therefore ruined, windshield due to metal-to-glass contact. The complicated yoke or bridge constructions pack with snow, sleet or ice under winter driving conditions to render the blade useless for wiping operations at the time when it is most needed.

The present invention proposes a totally new approach to the problem of designing a windshield wiper assembly for automotive utilization. More specifically, the present invention proposes a novel approach in providing an extremely simple, fool-proof, very inexpensive unitary arm and blade assembly. Preferably, the assembly is formed of plastic material, such as "Delrin" or the like, and various portions of the assembly are provided with integral hinge sections of reduced thickness and stiffness to accommodate relative movement of the arm portion and the blade portion and to accommodate deflection of the elastomeric wiping element into conformity with the windshield surface being traversed.

As a result of the concept herein set forth, the complicated, unduly multiplied connectors are entirely dispensed with, the possibility of windshield scratching is eliminated, and the danger of icing or freezing under adverse weather conditions is virtually eliminated.

To obtain these advantageous results, the windshield wiper assembly of the present invention preferably includes integrally formed arm and blade components joined by a resiliently deflectible hinge section of reduced thickness to accommodate rise and fall of the blade relative to the arm as the assembly traverses a windshield surface. The blade itself preferably comprises a longitudinal extending, arched bow secured at its longitudinal extremity to a wiping element carrier through hinge sections of reduced thickness to resiliently accommodate deformation of the wiping element edge into conformity to the curvature of the glass being wiped by the assembly. Preferably, there is positioned adjacent each of the hinge sections a pair of abuttable surface portions for limiting deflection of the hinge sections, thereby controlling distortion at the hinged sections.

The separate elastomeric wiping element is secured to the carrier section by suitable means. Such securement of the elastomeric wiping element may be by a suitable adhesive or by mechanical interlocking of the blade structure and the wiping element. For example, the wiping element may be positioned in a re-entrant groove formed in the carrier element during molding or by milling or otherwise cutting into the carrier element after molding. Alternatively, the carrier portion of the blade may be made in two portions each provided with a groove, the two portions cooperating when secured together to define a re-entrant groove within which the elastomeric element is secured upon assembly.

It is, therefore, an important object of the present invention to provide a new and improved plastic windshield wiper blade assembly having integrally formed, relatively movable components.

Another important object of this invention is the provision of an improved windshield wiper blade and arm assembly, the arm being adapted for attachment to an oscillatable pivot shaft and being connected to the wiper blade by means of an integral hinge section of reduced thickness to accommodate rise and fall of the blade during traversing movement of the assembly across the windshield.

It is a further important object of the present invention to provide an improved injection molded windshield wiper blade wherein a bow component is integrally joined to a wiper element carrier component by means of reduced thickness hinge sections accommodating conformation of the wiping element carried by the carrier component into conformity with a windshield traversed thereby.

Yet another object of this invention is the provision of an improved windshield wiper blade wherein a pair of complementary blade components are assembled after molding to define therebetween a re-entrant recess within which is trapped the attaching flange of a resilient wiping element.

Yet another, and no less important, object of the present invention is the provision of a windshield wiper blade and arm assembly for attachment to an oscillatable pivot shaft and including arm and blade components integrally formed by injection molding to provide an inexpensive, extremely simple, pre-assembled and trouble-free unitary structure.

Other objects of this invention will appear in the following description and appended claims, reference being had to the accompanying drawings forming a part of this specification wherein like reference characters designate corresponding parts in the several views.

On the drawings:

FIGURE 1 is a side elevational view of a windshield wiping assembly of the present invention mounted upon an oscillatable pivot shaft in operative position;

FIGURE 2 is an enlarged sectional view taken along the plane 2—2 of FIGURE 1;

FIGURE 3 is an enlarged fragmentary view illustrating the arm-to-blade connection;

FIGURE 4 is a fragmentary view similar to FIGURE 3 illustrating a hinge section of the blade;

FIGURE 5 is an end elevational view of the blade of FIGURE 1;

FIGURE 6 is a view similar to FIGURE 1 illustrating a modified form of wiper blade of the present invention;

FIGURE 7 is an enlarged fragmentary view of the blade of FIGURE 6;

FIGURE 8 is a sectional view taken along the plane 8—8 of FIGURE 6;

FIGURE 9 is a sectional view taken along the plane 9—9 of FIGURE 7;

FIGURE 10 is an enlarged sectional view taken along the plane 10—10 of FIGURE 8.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As shown on the drawings:

In FIGURE 1, reference numeral 15 refers generally to a windshield wiping assembly of the present invention adapted for attachment to an oscillatable pivot shaft 16 mounted upon the cowl 17 of an automobile adjacent a windshield 18 to be wiped. Of course, as is well known in the art, the oscillatable pivot shaft 16 may be driven by any suitable means, as by a suction motor, electric motor or hydraulic motor.

Mounted upon the oscillatable pivot shaft 16 is an attachment bracket 20 including a socket-type cap 21 drivingly connected, as by splines, to the pivot shaft 16 for oscillation therewith. The cap 21 is provided with a fixed radially projecting arm bracket 22 of generally inverted U-shape and having its depending legs 23 apertured as at 24 to receive a transverse pivot pin 25.

Projecting into the attachment bracket 22 is the free end of a mounting arm 30 forming a part of the windshield wiper assembly 15. The free end 31 of the arm 30 is transversely apertured, as at 32, to receive the pivot pin 25 therethrough. The pivot pin 25 thus secures the pivot shaft bracket 20 and the arm 30 for oscillation around the axis of the pivot shaft 16, a lock screw 26 being provided to lock the assembly. The pivot shaft bracket 20 and the arm 30 are preferably interconnected by a tension spring (not shown) as is well known in the art, the spring urging the arm 30 about the pivot pin 25 toward the windshield 18.

The arm 30 extends radially of the pivot shaft 16 and has its end 30a opposite the end 31 secured to the bow element 35 of the wiper blade by means of a reduced thickness hinge section 33. In the illustrated embodiment of FIGURE 3, this hinge section 33 is coextensive in width with the arm 30 and the bow portion 35 and lies intermediate substantially circular recesses 34 cooperatively defined at the terminal end of the arm 30 and medially of the bow 35. Adjacent the recesses 34, the arm 30 is provided with longitudinally elongated abutment surfaces 36 spaced from the adjacent upper surfaces 37 of the bow 35 to limit the degree of pivotal movement between the arm 30 and the bow 35 about the reduced hinge section 33.

As illustrated in FIGURE 4 of the drawings, the longitudinal extremities of the bow 35 are joined to a longitudinally extending, nominally planar carrier element 40. More specifically, the juncture of the longitudinal extremities of the carrier portion 40 and of the bow 35 is effected throgh a reduced thickness hinge section 41 defined by a generally cylindrical transverse recess 42 similar to the recesses 34 heretofore described. Immediately adjacent the recess 42 are cooperating abutment surfaces 43 and 44 on the undersurface of the bow 35 and on the upper surface of the carrier 40, respectively.

As illustrated in FIGURE 5 of the drawings, the generally rectangular carrier portion 40 is provided with a lower re-entrant groove 45 having a downwardly opening slot 46. Positioned in the groove 45 is an elastomeric wiping element 46 having a free lower wiping edge 48, an upper enlarged flange 49 seated within the groove 46 and joined to the wiping edge by means of a reduced throat area 50 projecting through the slot 46.

As heretofore explained, the arm 30, the bow 35 and the carrier 40 are all preferably integrally formed by injection molding. By so injection molding the parts, a unitary structure is formed in which the arm 30 and the blade are secured together by the hinge portion 33 of reduced thickness, relative pivotal movement about the hinge section 33 being limited by the abutment surfaces 36 and 37. Thus, the requisite relative pivotal movement of the blade and the arm can be accommodated without the utilization of extraneous pivot means and by the inherent resiliency of the plastic material.

Similarly, the wiping element carrier portion 40 is integrally formed with the bow portion 35 of the blade, these portions being joined by the reduced section 41 about which hinged movement occurs as limited by the abutment surfaces 43 and 44. In this manner, the requisite deflection of the wiping element edge 48 for conformity to the surface of the windshield 18 can be obtained without undue flexing by virtue of the abutment surfaces 43 and 44. Of course, deflection of the carrier 40 to a concave configuration (as is necessary for conformation to a convexly crowned windshield 18) is accomplished against the resistance of the arched bow 35 to bending. The abutment surfaces 43, 44 limit such bending of the bow 35 or, conversely, limit the degree of concavity of the carrier 40.

In that embodiment of the invention illustrated in FIGURES 6 through 10, inclusive, a different version of an injection molded, unitary arm and blade assembly is illustrated. Upon the pivot shaft 55 of an automobile adjacent a windshield 56 is located a socket member 57 co-rotatable with the pivot shaft and provided with a transverse pivot pin 58 upon which is journalled an arm section 59 terminating at its free end in a socket 60. Projecting into the socket 60 and secured therein by suitable means is the free end of the windshield wiper assembly arm 61. The arm is joined through a hinge section 62 of reduced thickness similar to the hinge section 33 heretofore described to the blade portion 63 of the arm and blade assembly.

This blade portion 63 consists of a bow 65 having its remote ends joined through reduced hinge sections 67 to the ends of a longitudinally extending carrier element 70. As best illustrated in FIGURES 8 and 9, the arm 61, the bow 65 and the carrier 70 are preferably formed as mirror image, substantially identical sections. For example, as best shown in FIGURE 8, the bow 65 is formed of sections 65a and 65b, the sections being in longitudinal abutment at abutting faces 65c and 65d, respectively. To aid in locating the sections relative to one another, one of the faces, e.g. the face 65c of the section 65a, is preferably provided with a transversely projecting rib 65e, FIGURE 9, received in a mating groove 65f formed at the face 65d of the other section 65b. By so providing the rib 65e and the groove 65f, an increased area of contact is provided and indexing of the parts into their proper assembled relation is assured.

Additionally, the rib 65e is provided with spaced, transversely elongated studs 65g, FIGURE 8, which are adapted to be snugly received by correspondingly located apertures 65h traversing the section 65b, the free end 65j of each stud 65g being deformed mechanically or thermally into contact with the exterior surface of the section 65b. If desired, the exterior ends of the apertures 65h may be flared to provide room for deformation of the stud end. The studs 65g and the apertures 65h further locate the sections 65a and 65b relative to one another and deformation of the terminal projecting ends of the studs 65g, as at 65j, insures adequate securing together of the sections 65a and 65b in such located positions.

The lower carrier portion 70 is also formed by the assembly of two sections 70a and 70b, these sections being of substantially constant equivalent cross-section and having abutting longitudinal faces 70c and 70d which are preferably coplanar with the faces 65c and 65b of the bow 65. Additionally, the faces 70c and 70d of the carrier are provided with mating re-entrant recesses 70e and 70f opening downwardly through a transverse opening provided by laterally spaced faces 70g and 70h. A resilient wiping element 75 having a lower wiping edge 76 is secured in the re-entrant recesses 70e and 70f of the carrier 70 by means of an enlarged attachment flange 77 snugly seated in the recesses and joined to the lower wiping edge by a deflectible throat portion 78 projecting through the lower slot defined by the spaced cooperating carrier surfaces 70g and 70h. Thus, the wiping element 75 is trapped in the carrier 70 upon assembly of the carrier.

The carrier section 70a is provided with studs 70j projecting through the re-entrant recesses 70e and 70f and through an aperture 70k formed in the carrier section 70b. Once again, the end of the stud 70j is mechanically or thermally deformed, as at 70m, to secure the sections 70a and 70b of the carrier 70 in assembly. Entry of the studs through the re-entrant recesses is provided by cutting away or materially reducing the attachment flange 77 of the rubber element 75 as illustrated in FIGURE 10 of the drawings. The studs 70j serve as additional function of locking the wiping element 75 and the carrier 70 together against relative longitudinal displacement. Thus, the element 75 is securely retained.

As best illustrated in FIGURE 7 of the drawings, the bow 65 is secured to the carrier 70 by a reduced thickness hinge section 67 intermediate recesses 68, the bow ends being provided with horizontal abutment surfaces 69 to either side of the hinge section 67 to limit relative movement of the carrier 70 and the bow 65.

Thus, from the detailed description heretofore given, it will be readily appreciated that the present invention provides a new and novel arm and blade assembly wherein the arm and the blade are secured together by means of an integral hinge section of reduced thickness and provided with means for limiting relative arm to blade movement. This makes possible the formation of the arm and the blade as a single, unitary structure which can be readily injection molded or otherwise formed by conventional plastic forming techniques.

Additionally, the blade includes a unitary bow and carrier structure again interconnected by reduced thickness hinge sections to provide limited relative movement therebetween. The wiping element can be secured to the carrier portion of the blade, as by an adhesive, or secured by entrapment in a re-entrant slot milled or otherwise formed in the carrier (as shown in FIGURE 5) or formed by assembly of separate carrier sections abuttable at medial longitudinal faces. Obviously, the unitary arm and bow structure can be used with a separate carrier element and similarly a separate arm element can be used with the unitary bow and carrier structure.

Having thus described my invention, I claim:

1. A windshield wiper blade and arm assembly comprising a plastic unit having integrally formed arm, bow and carrier elements and an elastomeric wiping element secured to the carrier, the arm and bow being interconnected and the bow and carrier being interconnected, respectively, through integral reduced thickness hinge sections to accommodate relative pivotal movement of the bow relative to the arm and of the carrier relative to the bow upon windshield traversing movement of the assembly.

2. In a windshield wiper blade, a pair of complementary blade components each comprising integrally formed coextensive bow and carrier portions interconnected at the longitudinal extremities thereof only, the two sections being secured to one another at abutting longitudinal faces and the abutting faces of the carrier portions being recessed to define, upon joining, a central re-entrant groove coextensive with the carrier, and an elastomeric wiping element having a deflectible wiping edge and an enlarged attaching flange trapped in said re-entrant groove by joining of said components.

3. In a windshield wiper blade and arm assembly, a plastic assembly comprising integrally formed arm, bow and carrier components joined to one another for relative pivotal movement by reduced thickness hinge sections and a rubber wiping element carried by the carrier component, the carrier-to-bow hinge sections accommodating deflection of the carrier component to allow conformation of the wiping element to a curved windshied surface and the bow-to-arm hinge section accommodating rise and fall of the bow and arm as the assembly traverses a windshield, and normally spaced abutment surfaces adjacent each of said hinge sections to limit relative bow-to-arm and carrier-to-bow movement.

4. A windshield wiper blade and arm assembly for oscillation by power means across a windshield surface comprising integrally formed arm and blade elements, the blade element carrying an elastomeric wiping element, and the arm element and the blade element being interconnected through an integral hinge section of body less than either the blade and arm to accommodate relative pivotal movement of the blade element relative to the arm element upon windshield traversing movement of the assembly.

5. In a windshield wiper blade, a pair of complementary blade components, each such component comprising integrally formed bow and carrier portions interconnected at their longitudinal extremities by integral reduced thickness hinge sections, the two sections being joined at abutting longitudinal faces, the faces of the carrier portions being recessed to define, upon joining, a centrally located elongated re-entrant groove, and an elastomeric wiping element having a deflectible wiping edge projecting beyond the carrier for contact with a windshield and an enlarged securing flange trapped in said re-entrant groove.

6. In a windshield wiper blade and arm assembly, a plastic assembly comprising integrally formed arm, bow and carrier components joined to one another for relative pivotal movement by reduced thickness hinge section and a rubber wiping element carried by the carrier component, the carrier-to-bow hinge sections accommodating deflection of the carrier component to allow conformation of the wiping element to a curved windshield surface and the bow-to-arm hinge section accommodating rise and fall of the bow and arm as the assembly traverses a windshield.

7. A windshield wiper blade assembly comprising a unit having integrally formed bow and carrier elements and a separate elastomeric wiping element secured to the carrier the bow being connected to the carirer only at the carrier ends through integral reduced thickness hinge sections to accommodate pivotal movement of the carrier relative to the bow upon windshield traversing movement of the assembly.

8. In a windshield wiper blade, a blade component comprising an integrally formed bow and carrier interconnected only at the longitudinal extremities thereof by integral reduced thickness hinge sections accommodating relative pivotal movement, the bow and carrier having abuttable surface portions adjacent the hinge sections to limit relative pivotal movement, and an elastomeric wiping element secured to the carrier.

9. In a windshield wiper blade and arm assembly for attachment to a pivot shaft, integrally formed arm and blade components joined to one another for relative pivotal movement by an integral reduced thickness hinge section, the arm-to-blade hinge section accommodating rise and fall of the blade and arm as the assembly traverses a windshield, and a pivot shaft attachment assembly secured to the pivot shaft for oscillation therewith and including means for securing the arm thereto.

10. A windshield wiper comprising a plastic unit having integrally formed arm and blade elements, the arm and the blade being interconnected through an integral reduced thickness hinge section to accommodate pivotal movement of the blade relative to the arm upon windshield traversing movement of the assembly, and normally spaced abutment surfaces on the arm and the blade, respectively, located in proximity to the hinge section to limit relative pivotal movement.

11. In a windshield wiper blade, a wiping element carrier comprising a pair of complementary sections, the two sections being longitudinally coextensive and joined at abutting longitudinal faces which are recessed to define, upon joining, a central re-entrant groove, and an elastomeric wiping element having a deflectible wiping edge and an enlarged securing flange trapped in said re-entrant groove.

12. In a windshield wiper system driven by an oscillatable pivot shaft, an integral arm and blade assembly in which the arm and blade components are joined to one another for relative pivotal movement by a reduced thickness hinge portions, the blade including a separate elastomeric wiping element secured thereto, and separate attaching means for securing the arm and blade as a unit to the pivot shaft, the hinge portion accommodating rise and fall of the blade and arm as the assembly traverses a windshield upon oscillation of the pivot shaft.

13. In a windshield blade and arm assembly, a plastic assembly comprising integrally formed arm, bow and carrier components joined to one another for relative pivotal movement by reduced thickness hinge portions and a rubber wiping element carried by the carrier component, the carrier-to-bow hinge sections accommodating deflection of the carrier component to allow conformation of the wiping element to a curved windshield surface and the bow-to-arm hinge section accommodating rise and fall of the blade and arms as the assembly traverses a windshield.

References Cited in the file of this patent

UNITED STATES PATENTS

| | | |
|---|---|---|
| 2,280,225 | Finely | Apr. 21, 1942 |
| 2,517,247 | Seley | Aug. 1, 1950 |

FOREIGN PATENTS

| | | |
|---|---|---|
| 1,087,482 | Germany | Aug. 18, 1960 |